United States Patent [19]
Wolfinger

[11] 3,794,915
[45] Feb. 26, 1974

[54] CIRCUITRY FOR DETECTING LOW AMPLITUDE RAPID VARIATIONS IN A HIGH AMPLITUDE OUTPUT SIGNAL

[75] Inventor: John F. Wolfinger, Schenectady, N.Y.

[73] Assignee: General Electric Company, Cincinnati, Ohio

[22] Filed: July 23, 1971

[21] Appl. No.: 165,522

[52] U.S. Cl................. 324/111, 324/102, 324/130
[51] Int. Cl.......................... G01r 19/00, G01r 1/02
[58] Field of Search...... 324/11, 103 R, 103 P, 102, 324/130; 330/9

[56] References Cited
UNITED STATES PATENTS

| | | | |
|---|---|---|---|
| 3,047,797 | 7/1962 | Borsboom | 330/9 |
| 3,532,980 | 10/1970 | Tucker | 324/103 R |
| 3,541,446 | 11/1970 | Prozeller | 324/130 |

Primary Examiner—Rudolph V. Rolinec
Assistant Examiner—Ernest F. Karlsen
Attorney, Agent, or Firm—Thomas J. Bird, Jr.; Derek P. Lawrence

[57] ABSTRACT

Measuring circuitry is described having the capability of providing output signals indicative of low amplitude, rapid variations in a higher amplitude, slowly changing signal. The circuitry includes a transducer upon which the signals are imposed, a storage device such as a capacitor which is intermittently connected to output terminals of the transducer, means for coupling the capacitor to a data recovery system, and a sampling relay for changing the capacitor connection between the transducer and the data system whereby the average input voltage to the data system is reduced to zero but any variations in the signal are faithfully indicated.

2 Claims, 10 Drawing Figures

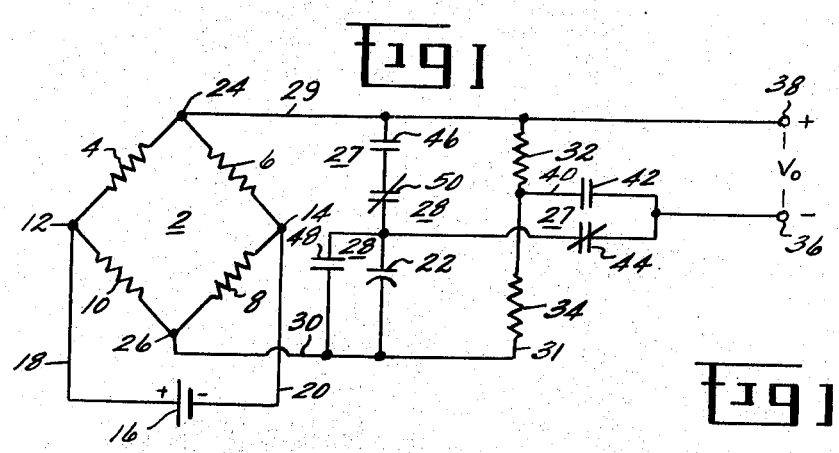
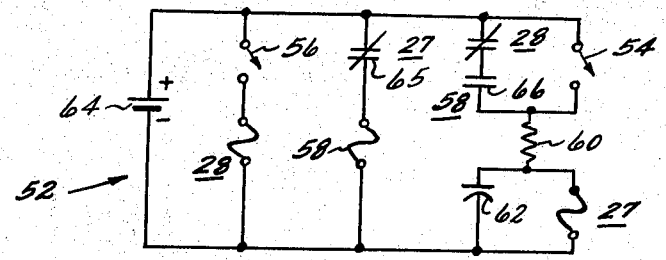
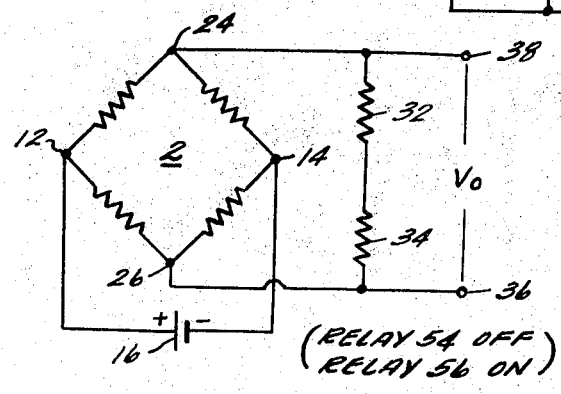
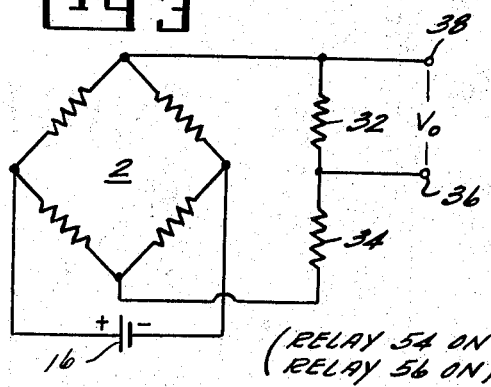
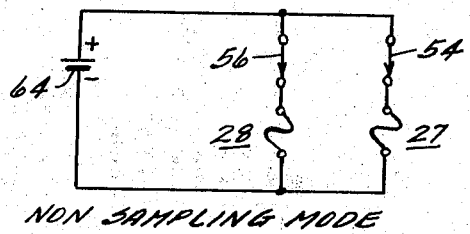

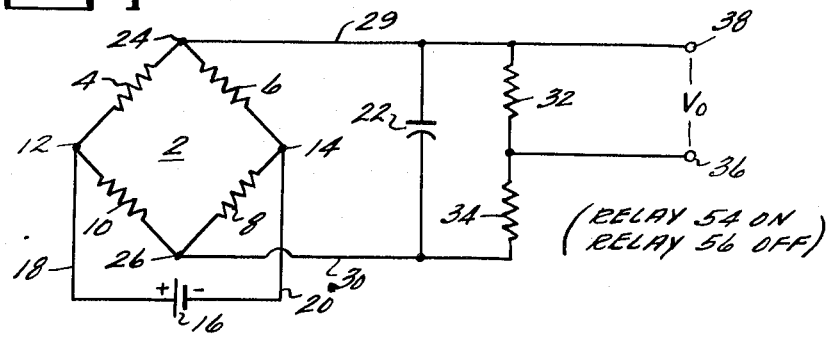
Fig 4
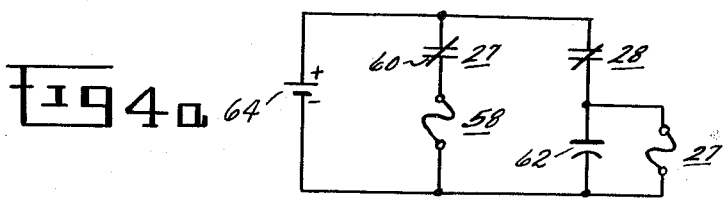
Fig 4a.  DURING A SAMPLE
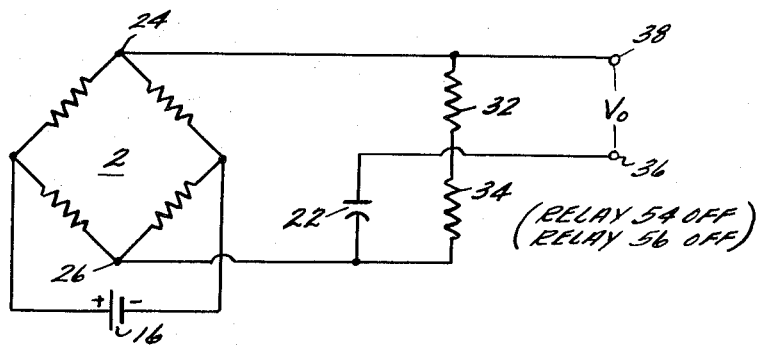
Fig 5
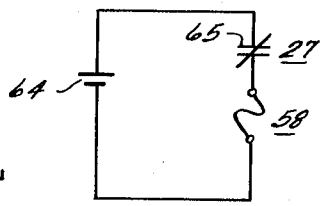
Fig 5a.  BETWEEN SAMPLES 3,794,915

CIRCUITRY FOR DETECTING LOW AMPLITUDE RAPID VARIATIONS IN A HIGH AMPLITUDE OUTPUT SIGNAL

BACKGROUND of THE INVENTION

This invention relates generally to electrical circuitry of the signal measuring type and, more particularly, to such circuitry adapted to provide broad range frequency response for extremely small variations in a high amplitude, slowly changing signal. The invention herein described was made in the course of or under a contract, or a subcontract thereunder, with the United States Department of the Air Force.

In many measurement applications, it is necessary to record low level dynamic data from some source at a frequency approaching zero cycles per second. For example, it is often desirable to be able to measure changes in pressure levels in an inlet of a gas turbine engine on the order of 0.01 to 1.0 psi over a frequency range of from 0 $H_z$ to 8 $kH_z$. Pressure transducers having the capability of providing outputs indicative of such small pressure level changes are available.

In addition to measuring these extremely small pressure changes, an operator normally desires to record the so-called steady state or d.c. pressure data which would consist of a high amplitude, low frequency or slowly changing signal. Transducers are also available which will provide the needed accuracies for this steady state data.

Problems arise, however, when one desires to use a single pressure transducer for detection and then attempts to separate the low amplitude variations from the high amplitude, low frequency steady state signal. For example, transducers well known in the art can be coupled to a data system having a sensitivity range down to 5 millivolts (mv) or less. In this range, the signal to noise ratio of the transducer is greater than 40 db. This means that signals of amplitudes greater than fifty microvolts peak to peak can be recorded and recovered. With such a system, a 5 mv output signal corresponds to one psi and a fifty microvolt output signal corresponds to 0.01 psi. Thus, a data system incorporating such a transducer can acquire data from 0.01 to 1.0 psi at its highest sensitivity range. The data system considered here has a frequency response that is known and is essentially flat from zero cycles to 8,000 cycles per second. Thus, if one could directly couple such a transducer into the data system utilizing the high sensitivity range, outputs of the low amplitude variations over the entire frequency range could be attained.

When one attempts to utilize this high sensitivity range for the transducer, however, problems arise. For example, the transducer is inherently temperature sensitive and when applied to an environment such as a gas turbine engine where the temperature range may be on the order of 200° to 300° F, the zero offset of the transducer due solely to temperature may be as great as 10 mv. A 10 mv offset, when coupled to the high sensitivity range, provides an offset of 2 psi. This, of course, totally precludes use of the transducer for measuring the desired range of 0.01 psi to 1.0 psi. Because of these temperature characteristics, a much lower sensitivity range must be used.

A second problem arises in that such transducers are differential transducers wherein a pressure is supplied to the back of each transducer from a known source of pressure. Because of the gas turbine engine environment, this back pressure cannot be controlled to a much narrower range than plus or minus 1 psi. This again precludes use of the highest sensitivity range of the transducer.

In summary, the problem becomes one of how to use the most sensitive range on the data system, how to measure the steady state (mean value) transducer output, and how to obtain a very low frequency cutoff for the low amplitude variations. A simple capacitance coupled system will permit use of the most sensitive range and will provide a very low frequency cutoff, while a separate steady state system would produce the steady state transducer output. Use of the separate system has obvious disadvantages, however, in that additional transducers and circuitry are required; while the capacitance coupled system has a hidden disadvantage in that the lower the cutoff frequency becomes, the longer the transient recovery time becomes.

SUMMARY OF THE INVENTION

It is an object of this invention, therefore, to provide electrical circuitry capable of separating a broad frequency range of low amplitude, rapidly occurring variations from a high amplitude, slowly changing signal and providing outputs indicative of both from the same measuring components.

Briefly stated, the above object is attained by providing circuitry in which a capacitor is periodically charged to the mean value of a high amplitude signal and intermittently has subtracted therefrom the mean value charge from the high amplitude signal. In this manner a remaining signal is indicative of low amplitude variations from the last measured mean value of the high amplitude signal. The disclosed system is a capacitance coupled system (with an extremely long time constant of about 20,000 seconds) with provisions for forcing recovery. In addition, means are provided for measuring the steady state value of any transducer output while recovery is being forced.

DESCRIPTION OF THE DRAWINGS

While the specification concludes with a series of claims which distinctly claim and particularly point out the subject matter which Applicant regards as his invention, a complete understanding of the invention will be gained from a reading of the following description, which is given in connection with the accompanying drawing, in which:

FIG. 1 is a circuit diagram of a preferred embodiment of the present invention;

FIG. 1a is a circuit diagram of control circuitry for operating relays of FIG. 1, FIG. 2 is a circuit diagram showing the effective circuitry of FIG. 1 while operating in the normal mode;

FIG. 3 is a circuit diagram showing the effective circuitry of FIG. 1 while operating in a non-sampling mode; and FIGS. 4 and 5 are circuit diagrams showing the effective circuitry of FIG. 1 while operating in the sampling mode.

FIGS. 2a, 3a, 4a, and 5a are circuit diagrams of the control circuitry of FIG. 1a when set to operate the circuit of FIG. 1 in the modes of FIGS. 2, 3, 4, and 5 respectively.

DESCRIPTION OF A PREFERRED EMBODIMENT

Referring to the drawing wherein like numerals correspond to like elements throughout, the circuitry of FIG. 1 includes a transducer 2 which is shown to include four separate semi-conducting arms, which are represented by resistors 4, 6, 8, and 10. Input terminals 12 and 14 of the transducer 2 are connected across a voltage source 16 by means of conductors 18 and 20, respectively.

A capacitor 22 is connected across output terminals 24 and 26 of the transducer 2 through a pair of relay contacts 27 and 28 by means of conductors 29 and 30. Also connected across the conductors 29 and 30 in a line 31 are a pair of resistors 32 and 34. As shown, the relays 27 and 28 cooperate in a manner to be described to intermittently connect the capacitor 22 to the output terminals 24 and 26 of the transducer 2 and to change the connection of the capacitor 22 between the transducer 2 and output terminals 36 and 38, which provide an output voltage $V_o$ for the overall circuitry shown in FIG. 1.

As further shown in FIG. 1, the relay 27 includes a normally open contact 42 located in a line 40 which connects the output terminal 36 to the line 31 intermediate the resistors 32 and 34. The relay 27 further includes a normally closed contact 44 positioned between the capacitor 22 and the output terminal 36, and a normally open contact 46 positioned between the capacitor 22 and the output terminal 38. Referring still to FIG. 1, the relay 28 includes a normally open contact 48 connected in parallel with the capacitor 22 and a normally closed contact 50 connected in series with the contact 46 of the relay 27.

Control circuitry for operating the relays 27 and 28 is shown in FIG. 1A and is generally labeled by the numeral 52. The control circuitry 52 is provided for illustrative purposes only and is not meant to be all inclusive. As shown, the control circuitry for the relays 27 and 28 includes a pair of single throw switches 54 and 56, a time delayed relay 58, a resistor 60, a capacitor 62, and power source 64 for the operating relays.

In order to describe the operation of the above circuitry, typical values will be assigned to the components as follows: capacitor 22 equals 1 mf; resistors 4, 6, 8 and 10 equal 1,000 ohms, resistor 32 equals 10,000 ohms; and resistor 34 equals 90,000 ohms. The impedance of the data system (connected to the terminals 36 and 38) is assumed to be at least 20,000 M. These values are given for illustrative purposes only and are in no way meant to be limiting.

The operation of the circuitry described above will now be discussed with reference being made to the fact that there are four possible states for the pair of relays 27 and 28. These states are as follows:

| State | Relay 27 | Relay 28 |
|---|---|---|
| 1 | on | on |
| 2 | on | off |
| 3 | off | on |
| 4 | off | off |

The control system 52 permits selection of any of these states as follows: State 3 represents the direct mode where the transducer 2 is connected to the data system as if the rest of the circuitry were not present (i.e., $V_o$ is the output directly from the transducer 2). State 3 is achieved by manually closing the switch 56 and opening the switch 54. The effective circuitry for this state is as shown in FIG. 2 with the control circuitry as shown in FIG. 2A.

State 1 represents the attenuated mode. That is, state 1 is basically the same as state 3 except that $V_o$ is the output of the transducer 2 attenuated by the factor $R_{32}/(R_{32}-/-R_{34})$. In the present case, $V_o$ equals one-tenth the output of the transducer 2. The effective circuitry for this mode is as shown in FIG. 3, and the control circuitry is as shown in FIG. 3A.

Referring now to FIGS. 4 and 5, the sampling mode will be discussed. In operation, the relay 27 provides the sampling function and is caused to operate for a preset sampling time, e.g., 50 microseconds, every 15 to 60 seconds by means of the time delay relay 58. States 2 and 4 both occur when the circuitry is operating in the sampling mode. State 2 occurs during the sampling time (i.e., 50 microseconds) and results in circuitry as shown in FIG. 4, while state 4 occurs between sampling times and results in circuitry as shown in FIG. 5.

As will be shown, the sampling mode (states 2 and 4) occurs automatically when the switches 54 and 56 are both off. It works as follows: the time delay relay 58 is off and remains off for a preset time after a voltage is applied to it by means of the power source 64. It stays on after this time as long as the voltage is applied. If the voltage is removed and then applied, the relay 58 goes off and does not come on until the preset time interval has elapsed.

In this particular circuit, the time delay relay 58 is energized through a contact 65, which forms a part of the relay 27. When the time delay relay 58 operates after some preset time delay, it closes a contact 66 which then operates the relay 27, through the resistor 60. The combination of the resistor 60 and the capacitor 62 allows some change to build up on the capacitor 62 before the relay 27 operates. When the relay 27 operates, however, it opens the contact 65 which de-energizes the relay 58 and thus, in turn, de-energizes the relay 27. The stored charge on capacitor 62 keeps the relay 27 active for the 50 microseconds sample time. The relay 27 then releases which reapplies voltage to the time delay relay 58 and to the contact 65. After the elapsed time delay, this process repeats.

During the 50 microseconds sampling time, the system is coupled as shown in FIG. 4 due to the control circuitry of FIG. 4A, whereupon the capacitor 22 is charged and at the same time one-tenth of the output voltage of the transducer 2 is applied between the output terminals 36 and 38. Between each of these sampling times, the circuit is coupled as shown in FIG. 5 as a result of the control circuitry of FIG. 5A. In this state, the output of the transducer 2 is a.c. coupled through the capacitor 22 into the data system ($V_o$) which has an extremely high impedance, i.e., greater than 20,000 M. Since the assumed value for the capacitor 22 is 1 microfarad, the time constant for the circuitry of FIG. 5 is 20,000 seconds. Any change in the output of the transducer 2 will be transmitted to the data system at the output terminals 36 and 38 and will decay to 37 per cent of its initial value only after 20,000 seconds. Because of the reversed connection of the capacitor 22 from that shown in FIG. 4 to that of FIG. 5, the input voltage to the data system is reduced to zero, but any subsequent changes in the output of the transducer 2 will be faithfully indicated at the terminals 36 and 38.

The circuitry thus takes advantage of the large ratio between the discharging time constant (20,000 seconds) and the charging time constant (1 ms).

As a result of the above, we end up with a signal at the output terminals 36 and 38 having zero mean value and an extremely low frequency cutoff in the sampling mode between sampling periods. Furthermore, during the sampling period, we end up with a signal at the output terminals 36 and 38 which is indicative of the mean value of the transducer 2 during that sampling period. In other words, the circuitry described above permits use of the highest sensitivity range of the transducer 2 and thereby provides outputs indicative of extremely rapidly occurring, low amplitude variations in the output of the transducer 2, while also providing outputs indicative of the mean value or steady state value of the transducer 2.

What I claim is:

1. Circuitry for measuring both a high amplitude, slowly changing signal and low amplitude, rapid variations in said higher amplitude, slowly changing signal, said circuitry including: a transducer subjected to said signal, means for connecting the output of said transducer to a data recovery system, a storage device, means for intermittently charging said storage device to an extent dependent upon the intensity of said signal imposed upon said transducer, and means for connecting said storage device to said data recovery system, said intermittent charging means comprising relay means including a time delay relay for intermittently connecting said storage device to said transducer and a sampling relay for changing the connection of said storage device between said transducer and said data recovery system whereby the average input voltage is imposed upon said data recovery system and is capable of being recovered during a first sampling time period when said time delay relay is operating and said average input voltage is reduced to zero during a second time period between samples such that only variations in the signal are imposed on said data recovery system during said second time period.

2. The circuitry recited in claim 1 wherein said storage device comprises a capacitor and said transducer includes a first and a second output terminal, said first terminal being connected to one side of said capacitor and said second terminal being connected to the remaining side of said capacitor through portions of said relay means.

* * * * *